United States Patent
Li

(10) Patent No.: US 10,298,008 B2
(45) Date of Patent: May 21, 2019

(54) DC TO DC BOOST CONVERTER

(71) Applicant: Shenzhen China Star Optoelectronics Technology Co., Ltd., Shenzhen, Guangdong (CN)

(72) Inventor: Wendong Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 263 days.

(21) Appl. No.: 15/125,157

(22) PCT Filed: Jul. 12, 2016

(86) PCT No.: PCT/CN2016/089754
§ 371 (c)(1),
(2) Date: Sep. 10, 2016

(87) PCT Pub. No.: WO2017/190430
PCT Pub. Date: Nov. 9, 2017

(65) Prior Publication Data
US 2018/0115150 A1 Apr. 26, 2018

(30) Foreign Application Priority Data
May 4, 2016 (CN) .......................... 2016 1 0288291

(51) Int. Cl.
*H02H 7/12* (2006.01)
*H02H 1/00* (2006.01)
(Continued)

(52) U.S. Cl.
CPC .............. *H02H 7/1213* (2013.01); *G09G 3/36* (2013.01); *G09G 3/3696* (2013.01);
(Continued)

(58) Field of Classification Search
CPC ...... H02H 7/1213; H02H 1/0007; H02M 1/32
See application file for complete search history.

(56) References Cited

U.S. PATENT DOCUMENTS 8,692,477 B1 4/2014 Lee
2002/0118823 A1* 8/2002 Tomobe .............. H04M 19/008
379/413
(Continued)

FOREIGN PATENT DOCUMENTS

CN 1451200 A 10/2003
CN 1819426 A 2/2007
(Continued)

*Primary Examiner* — Scott Bauer
(74) *Attorney, Agent, or Firm* — Andrew C. Cheng

(57) ABSTRACT

The present disclosure discloses a DC to DC boost converter, comprising a boosted circuit, a protecting circuit, a detecting circuit, a feedback control circuit, and a feedback circuit. The boosted circuit outputs voltage to the outside through the protecting circuit, the protecting circuit controls the boosted circuit to output voltage to the outside according to the current output from the boosted circuit. The detecting circuit detects the output voltage of the protecting circuit and controls whether the feedback control circuit proceeds the feedback control to the boosted circuit according to the feedback voltage of the feedback circuit or not according to the detected output voltage. The DC to DC boost converter adds the protecting circuit and the detecting circuit, which completely shuts the output down while the output is short, thus achieving short-protecting circuit and reducing power consumption.

8 Claims, 1 Drawing Sheet

(51) Int. Cl.
*H02M 1/32* (2007.01)
*G09G 3/36* (2006.01)
*H02M 3/04* (2006.01)
*H02M 3/155* (2006.01)

(52) U.S. Cl.
CPC ............ *H02H 1/0007* (2013.01); *H02M 1/32* (2013.01); *H02M 3/04* (2013.01); *H02M 3/155* (2013.01); *G09G 2330/02* (2013.01); *G09G 2330/021* (2013.01); *G09G 2330/04* (2013.01); *G09G 2330/12* (2013.01)

(56) References Cited

U.S. PATENT DOCUMENTS

| | | | |
|---|---|---|---|
| 2004/0075423 A1* | 4/2004 | Itabashi | H02M 3/156 323/282 |
| 2010/0046124 A1 | 2/2010 | Hibi | |
| 2010/0127678 A1* | 5/2010 | Inatomi | H02M 1/32 323/282 |
| 2011/0187337 A1* | 8/2011 | Lin | G05F 1/10 323/282 |
| 2015/0222110 A1* | 8/2015 | Sidapara | H02H 3/066 361/93.7 |

FOREIGN PATENT DOCUMENTS

| | | |
|---|---|---|
| CN | 1909349 A | 2/2007 |
| CN | 1960148 A | 5/2007 |
| CN | 101478240 A | 7/2009 |
| CN | 201438672 U | 4/2010 |
| CN | 104049559 A | 9/2014 |
| CN | 104135153 A | 11/2014 |
| JP | 4096297 B2 | 3/2008 |

\* cited by examiner

DC TO DC BOOST CONVERTER

BACKGROUND OF THE INVENTION

1. Field of the Invention

The present disclosure relates to the fields of liquid crystal display driving circuit technology, and in particular to a DC to DC boost converter.

2. The Related Arts

The DC to DC boost converter makes the output voltage higher than the input voltage. The boost process is an inductive energy transfer process. That is, when charging, the inductance absorbs energy, and the inductance releases energy when discharging. The DC to DC boost converter achieves stable output through the boosted circuit, the feedback circuit, and the feedback control circuit thereof. However, when the output is short, the input power will form a short circuit through the inductance and the rectifier diode, leading to power failure.

For general protecting circuits, when the input is undervoltage and overvoltage, and the output is overcurrent, short, overvoltage, and over temperature, it requires the circuit able to automatically turn off the output or implement Hiccup protection, to facilitate the immediate protection of the following load or circuit and to avoid the damages. But in respect to the DC to DC boost converter, the inductance and the rectifier diode are series in the circuits of input and output, so even the switch driving is completely turned off, the output can not be completely shut down.

Therefore, it needs to develop a new DC to DC boost converter to solve the above problems.

SUMMARY OF THE INVENTION

The object of the present invention is to provide a DC to DC boost converter, which completely shuts the output down while the output is short through adding a protecting circuit and a detecting circuit, thus achieving short-protecting circuit and reducing power consumption.

To achieve the above object of the disclosure, the present disclosure provides a DC to DC boost converter, comprising a boosted circuit, a protecting circuit, a detecting circuit, a feedback control circuit, and a feedback circuit; wherein, the boosted circuit outputs voltage to the outside through the protecting circuit, the protecting circuit controls the boosted circuit to output voltage to the outside according to the current output from the boosted circuit; wherein, the detecting circuit detects the output voltage of the protecting circuit and controls whether the feedback control circuit proceeds the feedback control to the boosted circuit according to the feedback voltage of the feedback circuit or not according to the detected output voltage.

If the output current of the boosted circuit is larger than or equal to a predetermined threshold value, the protecting circuit stops outputting the output voltage of the boosted circuit to the outside. If the output current of the boosted circuit is less than a predetermined threshold value, the protecting circuit outputs the output voltage of the boosted circuit to the outside.

If the voltage value of the output voltage detected by the detecting circuit is zero, the detecting circuit controls the feedback control circuit not to proceed the feedback control to the boosted circuit according to the feedback voltage of the feedback circuit. If the voltage value of the output voltage detected by the detecting circuit is not zero, the detecting circuit controls the feedback control circuit to proceed the feedback control to the boosted circuit according to the feedback voltage of the feedback circuit.

The protecting circuit comprises a resettable fuse. One terminal of the resettable fuse is connected to the output terminal of the boosted circuit, the other terminal of the resettable fuse acts as the output terminal of the DC to DC boost converter.

The detecting circuit comprises a first resistor and a zener diode; one terminal of the first resistor is connected to the output terminal of the protecting circuit, the other terminal of the first resistor is connected to the zener diode and the feedback control circuit.

The other terminal of the first resistor is connected to the cathode of the zener diode, the anode of the zener diode is grounded.

The detecting circuit further comprises a second resistor; the other terminal of the first resistor is connected to the feedback control circuit through the second resistor.

The present disclosure provides a DC to DC boost converter, which controls the voltage output to the outside through the added protecting circuit. At the same time, it utilizes the detecting circuit to detect the output voltage of the protecting circuit and to control whether the feedback control circuit proceeds the feedback control to the boosted circuit according to the feedback voltage of the feedback circuit or not according to the detected output voltage. The DC to DC boost converter adds the protecting circuit and the detecting circuit, which completely shuts the output down while the output is short, thus achieving short-protecting circuit and reducing power consumption.

DETAILED DESCRIPTION OF THE PREFERRED EMBODIMENTS

Figure 1:
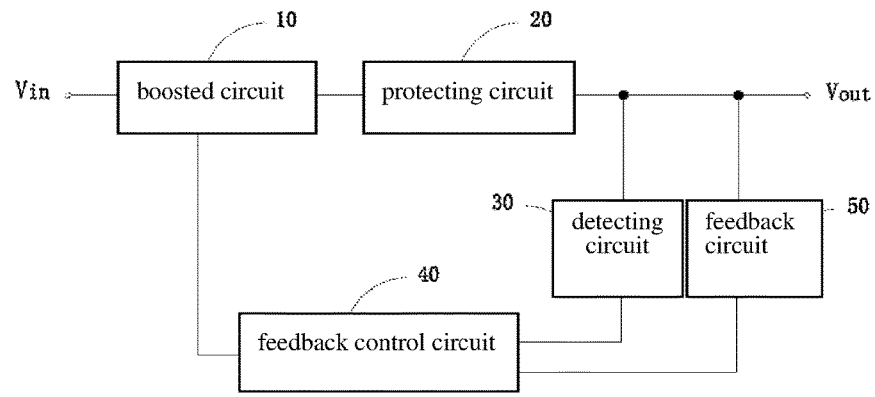
FIG. 1 is a schematic view illustrating the circuit of the DC to DC boost converter according to the embodiment of the present disclosure.
Figure 2:
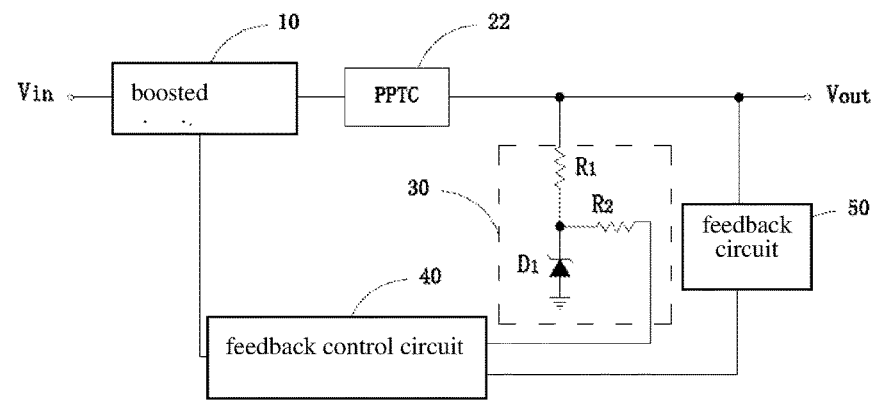
FIG. 2 is a specific example of the DC to DC boost converter as shown in FIG. 1.

The following refers to FIGS. 1 and 2 to describe the DC to DC boost converter according to the embodiment of the present disclosure.

FIG. 1 is a schematic view illustrating the circuit of the DC to DC boost converter according to the embodiment of the present disclosure. Referring to FIG. 1, the embodiment of the present disclosure provides a DC to DC boost converter, comprising a boosted circuit 10, a protecting circuit 20, a detecting circuit 30, a feedback control circuit 40, and a feedback circuit 50. The boosted circuit 10 outputs voltage to the outside through the protecting circuit 20, the protecting circuit 20 outputs current according to the boosted circuit 10 to control the boosted circuit 10 to output voltage to the outside. The detecting circuit 30 detects the output voltage of the protecting circuit 20 and controls whether the feedback control circuit 40 proceeds the feedback control to the boosted circuit 10 according to the feedback voltage of the feedback circuit 50 or not according to the detected output voltage.

In the present embodiment, if the output current of the boosted circuit 10 is larger than or equal to a predetermined threshold value (such as the output is short and breakdown), the protecting circuit 20 stops outputting the output voltage of the boosted circuit 10 to the outside; if the output current of the boosted circuit 10 is less than a predetermined threshold value (such as the circuit is under normal working condition), the protecting circuit 20 outputs the output voltage of the boosted circuit 10 to the outside.

FIG. 2 is a specific example of the DC to DC boost converter as shown in FIG. 1.

Referring to FIG. 2, the protecting circuit 20 comprises a resettable fuse 22 (Polymer Positive Temperature Coefficient, PPTC). One terminal of the resettable fuse 22 is connected to the output terminal of the boosted circuit 10, the other terminal of the resettable fuse 22 acts as the output terminal of the DC to DC boost converter. If the output current of the boosted circuit 10 is larger than or equal to a predetermined threshold value, the resettable fuse 22 stops outputting the output voltage of the boosted circuit 10 to the outside; if the output current of the boosted circuit 10 is less than a predetermined threshold value, the resettable fuse 22 outputs the output voltage of the boosted circuit 10 to the outside.

Specifically, the resettable fuse is an electronic overcurrent protection component, which is made of specially treated polymers and conductive particles (such as carbon black) distributed inside. Under normal operation, the polymers make the conductive particles tightly bound outside the crystalline structure, which constitutes a chain conductive path. At this time, the resettable fuse is under low resistance state. The thermal energy generated by the current flowing through the resettable fuse in the circuit is small, which will not change the crystalline structure. When the circuit is short or overload, the thermal energy generated by the large current flowing through the resettable fuse makes the polymers melt, the volume thereof rapidly grows and forms high resistance state, thus the operating current decreases rapidly, which limits and protects the circuits. When the issues are eliminated, the resettable fuse is re-cooling and crystallizing, the volume resettable fuse thereof shrinks, the conductive particles form conductive path again, the volume resettable fuse is restored to low resistance state, thus completing the circuit protection without artificial replacement.

In the present embodiment, if the voltage value of the output voltage of the protecting circuit 20 detected by the detecting circuit 30 is zero (such as the output is short and breakdown), the detecting circuit 30 controls the feedback control circuit 40 not to proceed the feedback control to the boosted circuit 10 according to the feedback voltage of the feedback circuit 50; if the voltage value of the output voltage of the protecting circuit 20 detected by the detecting circuit 30 is not zero (such as the circuit is under normal working condition), the detecting circuit 30 controls the feedback control circuit 40 to proceed the feedback control to the boosted circuit 10 according to the feedback voltage of the feedback circuit 50.

For example, the detecting circuit 30 comprises a first resistor $R_1$ and a zener diode $D_1$. One terminal of the first resistor $R_1$ is connected to the output terminal of the protecting circuit 20, the other terminal of the first resistor $R_1$ is connected to the zener diode $D_1$ and the feedback control circuit 40. Specifically, the other terminal of the first resistor $R_1$ is connected to the cathode of the zener diode $D_1$, the anode of the zener diode $D_1$ is grounded. It should be understood that, when the output voltage Vout of the protecting circuit 20 detected by the detecting circuit 30 achieves the working condition of the zener diode $D_1$ through the first resistor $R_1$, the zener diode $D_1$ starts to work, so that the voltage output from the detecting circuit 30 to the feedback control circuit 40. In the present embodiment, the first resistor has the function of current limiting protection, so the current flow through the zener diode is smaller, which protects the zener diode.

Preferably, the detecting circuit 30 further comprises a second resistor $R_2$; the other terminal of the first resistor $R_1$ is connected to the feedback control circuit 40 through the second resistor $R_2$.

The working principle of the DC to DC boost converter according to the embodiment of the present disclosure is as follows.

The boosted circuit 10 receives the input DC voltage Vin and outputs the voltage Vout to the outside through the protecting circuit 20. The protecting circuit 20 controls the boosted circuit 10 to output voltage to the outside according to the current output from the boosted circuit 10. The detecting circuit 30 detects the output voltage Vout of the protecting circuit 20 and controls whether the feedback control circuit 40 proceeds the feedback control to the boosted circuit 10 according to the feedback voltage of the feedback circuit 50 or not according to the detected output voltage Vout.

Specifically, when the output is short, the output current of the boosted circuit 10 is larger than or equal to a predetermined threshold value, the protecting circuit 20 stops outputting the output voltage of the boosted circuit 10 to the outside, which cuts off the voltage output to the outside. In this situation, the voltage value of the output voltage Vout of the protecting circuit 20 detected by the detecting circuit 30 is zero, the detecting circuit 30 controls the feedback control circuit 40 not to proceed the feedback control to the boosted circuit 10 according to the feedback voltage of the feedback circuit 50, which completely shuts the output down while the output is short, thus achieving short-protecting circuit and reducing power consumption.

After the output short issues are eliminated, that the DC to DC boost converter is working properly, the output current of the boosted circuit 10 is less than a predetermined threshold value, the protecting circuit 20 outputs the output voltage of the boosted circuit 10 to the outside. In this situation, the voltage value of the output voltage Vout of the protecting circuit 20 detected by the detecting circuit 30 is not zero (it should be appreciated that the voltage value is input DC voltage Vin, output voltage Vout, or a certain voltage value of input DC voltage Vin to the output voltage Vout), the detecting circuit 30 controls the feedback control circuit 40 to proceed the feedback control to the boosted circuit 10 according to the feedback voltage of the feedback circuit 50.

The DC to DC boost converter according to the above embodiment of the present disclosure adds the protecting circuit and the detecting circuit, which completely shuts the output down while the output is short, thus achieving short-protecting circuit and reducing power consumption.

The above embodiments have been shown and described, but those skilled in the art should appreciate the inventive concept of the present disclosure is not limited to these embodiments. The above embodiments can be modified and changed variously without departing from the spirit and principles of the present disclosure.

What is claimed is:

1. A DC to DC boost converter, comprising a boosted circuit, a protecting circuit, a detecting circuit, a feedback control circuit, and a feedback circuit;
   wherein the boosted circuit outputs a voltage to the outside through the protecting circuit, such that the protecting circuit controls the output of the voltage to the outside as an output voltage according to an output current supplied from the boosted circuit;

wherein the detecting circuit detects the output voltage of the protecting circuit and, in response to the output voltage detected thereby, controls the feedback control circuit to allow feedback control that is carried out according to a feedback voltage of the feedback circuit to be applied to the boosted circuit;

wherein the output of the output voltage to the outside through the protecting circuit is determined by the output current supplied from the boosted circuit, such that when the output current of the boosted circuit is larger than or equal to a predetermined threshold value, the protecting circuit stops outputting the output voltage to the outside; and when the output current of the boosted circuit is less than the predetermined threshold value, the protecting circuit outputs the output voltage to the outside.

2. The DC to DC boost converter as claimed in claim 1, wherein when the output voltage detected by the detecting circuit is zero, the detecting circuit controls the feedback control circuit not to allow the feedback control that is carried out according to the feedback voltage of the feedback circuit to be applied to the boosted circuit.

3. The DC to DC boost converter as claimed in claim 1, wherein when the output voltage detected by the detecting circuit is not zero, the detecting circuit controls the feedback control circuit to allow the feedback control that is carried out according to the feedback voltage of the feedback circuit to be applied to the boosted circuit.

4. The DC to DC boost converter as claimed in claim 1, wherein the protecting circuit comprises a resettable fuse.

5. The DC to DC boost converter as claimed in claim 4, wherein one terminal of the resettable fuse is connected to an output terminal of the boosted circuit, and the other terminal of the resettable fuse acts as the output terminal of the DC to DC boost converter that outputs the output voltage to the outside.

6. The DC to DC boost converter as claimed in claim 1, wherein the detecting circuit comprises a first resistor and a zener diode; one terminal of the first resistor is connected to the output terminal of the protecting circuit, and the other terminal of the first resistor is connected to the zener diode and the feedback control circuit.

7. The DC to DC boost converter as claimed in claim 6, wherein the other terminal of the first resistor is connected to a cathode of the zener diode, and an anode of the zener diode is grounded.

8. The DC to DC boost converter as claimed in claim 6, wherein the detecting circuit further comprises a second resistor; the other terminal of the first resistor is connected to the feedback control circuit through the second resistor.

* * * * *